(12) United States Patent
Bergquist et al.

(10) Patent No.: US 10,418,917 B2
(45) Date of Patent: Sep. 17, 2019

(54) ACTIVE FILTER TOPOLOGY FOR CASCADED INVERTERS

(71) Applicant: ABB Schweiz AG, Baden (CH)

(72) Inventors: Gustav Bergquist, Stockholm (SE); Tomas Modeer, Stockholm (SE); Joakim Asplund, Stockholm (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/777,560

(22) PCT Filed: Nov. 11, 2016

(86) PCT No.: PCT/SE2016/051112
§ 371 (c)(1),
(2) Date: May 18, 2018

(87) PCT Pub. No.: WO2017/086861
PCT Pub. Date: May 26, 2017

(65) Prior Publication Data
US 2019/0081574 A1    Mar. 14, 2019

(30) Foreign Application Priority Data
Nov. 18, 2015 (SE) ..................... 1551491

(51) Int. Cl.
*H02M 7/49* (2007.01)
*H02J 3/38* (2006.01)
(Continued)

(52) U.S. Cl.
CPC .............. *H02M 7/49* (2013.01); *H02J 3/01* (2013.01); *H02J 3/38* (2013.01); *H02M 1/08* (2013.01);
(Continued)

(58) Field of Classification Search
CPC . H02M 2001/0077; H02M 2001/0093; H02M 7/49
(Continued)

(56) References Cited

U.S. PATENT DOCUMENTS

| | | | | |
|---|---|---|---|---|
| 3,409,818 A | * | 11/1968 | Gillett | .................... G10K 11/24 307/58 |
| 2008/0236648 A1 | * | 10/2008 | Klein | ................ H01L 31/02021 136/244 |
| 2010/0253460 A1 | | 10/2010 | Wilson | |
| 2012/0099353 A1 | * | 4/2012 | Azuma | ................... H02M 7/49 363/71 |
| 2013/0155736 A1 | * | 6/2013 | Ilic | ......................... H02M 7/72 363/71 |

(Continued)

FOREIGN PATENT DOCUMENTS

| | | |
|---|---|---|
| EP | 2671310 A2 | 12/2013 |
| EP | 2928060 A1 | 10/2015 |

(Continued)

OTHER PUBLICATIONS

International Search Report and Written Opinion for International Application No. PCT/SE2016/051112, dated Feb. 17, 2018, 11 pages.

(Continued)

*Primary Examiner* — Gary A Nash
(74) *Attorney, Agent, or Firm* — Brake Hughes Bellermann LLP

(57) ABSTRACT

A method for generating a combined output waveform ($V_{OUT}$) in a power inverter system (100) is disclosed. The power inverter system comprises a voltage equaliser (120) having an energy storage element adapted to be charged by a combined output voltage from a plurality of switching units and to add an adjustable voltage to the combined output waveform. A voltage of the combined output wave- (Continued)

form is measured, a difference (Δ) between the measured voltage of the output waveform and a voltage of a target waveform ($U_T$) is determined, and a voltage ($U_{CORR}$) corresponding to the determined difference is added, by the voltage equaliser, to the combined output waveform so as to improve the matching of the combined output power waveform and the target power waveform.

17 Claims, 8 Drawing Sheets

(51) Int. Cl.
  *H02M 1/12* (2006.01)
  *H02M 7/483* (2007.01)
  *H02J 3/01* (2006.01)
  *H02M 1/08* (2006.01)
  *H02M 1/00* (2006.01)

(52) U.S. Cl.
  CPC ............ *H02M 1/12* (2013.01); *H02M 7/483* (2013.01); *H02M 2001/0077* (2013.01); *H02M 2001/0093* (2013.01); *H02M 2007/4835* (2013.01); *Y02E 40/26* (2013.01); *Y02E 40/40* (2013.01)

(58) Field of Classification Search
  USPC .............................................. 363/71, 98, 132
  See application file for complete search history.

(56) References Cited

U.S. PATENT DOCUMENTS

| | | | |
|---|---|---|---|
| 2013/0242628 A1* | 9/2013 | Fukatsu | H02J 3/383 363/71 |
| 2014/0175888 A1* | 6/2014 | Deboy | H02J 3/383 307/82 |
| 2015/0171726 A1 | 6/2015 | Singh Riar et al. | |

FOREIGN PATENT DOCUMENTS

| | | |
|---|---|---|
| WO | 2011127980 A1 | 10/2011 |
| WO | 2011134521 A1 | 11/2011 |

OTHER PUBLICATIONS

Da Silva et al., "Hybrid AC Power Source Based on Modular Multilevel Converter and Linear Amplifier", IEEE Transactions on Power Electronics, Institute of Electrical and Electronics Engineers, USA; Jan. 1, 2015; vol. 30, pp. 216-226.

Extended European Search Report for Application No. 16866748.3, dated Jun. 27, 2019, 11 pages.

* cited by examiner

ABSTRACT

ACTIVE FILTER TOPOLOGY FOR CASCADED INVERTERS

CROSS REFERENCE TO RELATED APPLICATION

This application is a 35 U.S.C. § 371 National Phase Entry Application from PCT/SE2016/051112, filed on Nov. 11, 2016, and designating the U.S., which claims priority under 35 U.S.C. § 119 to Swedish Patent Application No. 1551491-2, filed on Nov. 18, 2015, the disclosures of which are incorporated herein in their entireties by reference.

TECHNICAL FIELD

The invention disclosed herein relates to improving the matching of a combined output power waveform from a multilevel inverter and a target power waveform. More precisely, it relates to a method and system for delivering a smoother and more accurately matched switched output alternating voltage waveform that drives an AC matching a target AC.

BACKGROUND

When connecting two alternating voltage sources to each other, the matching of the sources is of interest in terms of target current control, overall efficiency and noise reduction. Such a matching is particularly relevant in a switched topology, wherein a stepped voltage waveform may be generated by a switched power inverter system and output e.g. an alternating current (AC) to e.g. the grid. The generated AC signal may hence comprise unwanted frequency components, such as e.g. harmonics, that originate from the switching process and/or the target alternating voltage waveform, and that differ from the harmonics of the required AC.

The issue of unwanted frequency components of the generated AC power has been addressed by implementing a filter blocking or suppressing certain frequencies. Inductors are e.g. known to block or reduce high-frequency components while capacitors are known to do the reverse. Components presenting less attenuation to low-frequency signals than high-frequency signals may be referred to as low-pass filters, whereas components presenting less attenuation to high-frequency signal than low-frequency signal may be referred to as high-pass filters.

Although such components may be used for reducing unwanted frequency components of the generated AC power signal, there is still a need for improved methods and devices for matching a generated alternating voltage to a desired alternating voltage waveform, and in particular in case the generated alternating voltage waveform is staircase shaped with relatively large steps in amplitude and time, i.e., wherein the difference between the target waveform and the output is not negligible.

SUMMARY

An object of at least some of the embodiments of the present invention is to provide an output alternating voltage matching a target alternating voltage, and in particular to provide an improved alternative to the above techniques.

Accordingly, the invention provides a method and a system with the features of the independent claims. The dependent claims define advantageous embodiments.

In a first aspect, a method for generating a combined output waveform, or AC, in a power inverter system is provided. The power inverter system comprises a plurality of switching units, wherein each one of the switching units is adapted to receive a respective input power, or DC, and wherein the plurality of switching units are interconnected to produce the combined output waveform. The system further comprises a voltage equaliser having an energy storage element adapted to be charged by the combined output voltage and to add an adjustable voltage to the combined output waveform. In the first aspect, the method comprises the steps of measuring a voltage of the combined output waveform, determining a difference between the measured voltage of the output waveform and a voltage of a target waveform, and adding, to the combined output waveform, a voltage corresponding to the determined difference.

In a second aspect, a power inverter system is provided, which is similarly configured as the power inverter system described with reference to the first aspect. According to the second aspect, the voltage equaliser comprises a measuring unit adapted to measure a voltage of the combined output waveform, a calculating unit adapted to determine a difference between the measured output waveform and a voltage of a target waveform, and a control circuitry adapted to add, to the combined output waveform, a voltage corresponding to the determined difference.

In the context of the present application, the terms "waveform", "output waveform", "output voltage waveform", "output voltage", "output power", "AC", "alternating current" and "alternating voltage" may be interchangeably used. The electrical power that is output from the power inverter system and/or the voltage equaliser may be understood as an alternating voltage driving an alternating current. This reasoning also applies to the output at the target source, which output e.g. may be referred to as "target voltage waveform", "target voltage" or "required voltage". Further, the term "voltage equaliser" could be interchangeably used with the term "current equaliser" or "electrical power equaliser".

The present aspects hence relate to conversion of input power, such as DC power, into alternating current or voltage. The alternating current or voltage may e.g. be suitable for feeding power to the power grid. The conversion may be achieved by synthesizing a voltage wave form from one or several input power sources by using series connected switching units. By adjusting the synthesized output waveform and, possibly, using a filter (inductance) connected between the synthesized waveform and a target source such as e.g. the power grid (representing the target waveform), a current can be controlled and driven into the target source or power grid.

The present invention makes use of an understanding that the matching between the output waveform and a target waveform, or desired voltage waveform, may be improved by utilising an additional voltage source, with energy storage capacity, for amplifying and/or attenuating the output waveform or signal when it deviates from the target waveform. The voltage difference between the actual output waveform and the required target waveform may hence be actively controlled during operation of the power inverter system so as to provide an improved matching and control of the output AC. Voltages of the output waveform determined to be too low may be amplified by the energy storage element adding a positive voltage to the output waveform, whereas voltages determined to be too high can be reduced by the energy storage element accumulating energy or adding a negative voltage to the output waveform. Levelling out or reducing the measured differences allows for an improved matching between the output waveform or signal and the desired waveform.

The use of the energy storage element is of particular advantage in power inverters having a switched multilevel topology. Multilevel inverters are known to form an output waveform of two or more levels, representing an approximation of the waveform of the desired waveform. Increasing the switching frequency may improve the waveform of the output voltage or AC in terms of reduced undesired frequency components and improved matching to the desired waveform. An increased switching frequency may however be associated with increased switching losses and a reduced power efficiency of the inverter system. There is in other words a trade-off between power efficiency and quality of the output AC (i.e., the correlation between the waveform of the output AC signal and the desired waveform). This balance may be affected for the better by means of the voltage equaliser according to the present aspects, since the matching of the output waveform to the desired waveform may be improved also at relatively low switching frequencies. The present aspects are hence particularly advantageous in connection with switched power inverters operating at relatively low switching frequencies, as the waveform of the output voltage or AC may be improved without increasing the switching frequency of the rest of the system and without the efficiency losses associated therewith. In other words, the present aspects allow for the power inverter system to operate at a lower switching frequency.

Further, by using a voltage equaliser acting as an additional voltage source (adding a positive voltage) and energy storage element (adding a negative voltage), relatively large and bulky passive filter components such as inductors and capacitors may be reduced in size or even be omitted. The present aspects hence allow for a smaller and lighter system as compared to prior art systems.

The voltage equaliser may be used in applications and systems wherein the respective input power varies over time and/or is difficult to predict. This may be the case in for e.g. photovoltaic (PV) elements or solar panels, wherein the output power may be determined by a non-linear relationship between voltage and current. Events like a passing shadow or differences in panel performance due to pollution, differential aging or differences during manufacturing may hinder an array of panels as whole to operate at its peak efficiency point. Even though each panel may be connected to a respective switching unit that is cascaded and individually operated in response to the input power from each one of the panels, there may still be a need for adjusting the waveform of output voltage waveform signal. By measuring the output waveforms (which may be characterised by voltage and/or current, etc), comparing it to the desired waveform and adjusting it based on the difference, the matching between the output voltage waveform and the desired voltage waveform, such as e.g. the grid voltage waveform, may be improved.

Alternatively, or additionally, the voltage equaliser may be operated in response to information relating to the operation or performance of individual switching units and/or the delivered input power from individual input power sources, such as e.g. solar panels.

According to an embodiment, the step of adding the voltage corresponding to the determined difference may be realised by charging the energy storage element in case the measured voltage exceeds a first threshold and by discharging the energy storage element in case the measured voltage is below a second threshold. The first threshold and the second threshold may be equal or different, and may be dynamically changed during operation or predefined and stored in e.g. a database. The first and second thresholds may be defined in relation to a voltage of the target waveform, and may in one example equal the voltage of the target waveform. The voltage of the target waveform may e.g. be predefined, determined during operation and/or a combination of both.

According to an embodiment, the energy storage element is a capacitive storage element or capacitor which may be charged by the output AC when the voltage is exceeding a voltage of the target waveform and discharged to cover the mismatch for voltages of the output waveform being below the voltage of the target waveform.

According to an embodiment, the voltage equaliser may be connected in series with the plurality of switching units. The voltage equaliser may therefore act on the combined output waveform. However, several voltage equalisers may be connected in series with the switching units so as to act on the combined output waveform.

According to an embodiment, the plurality of switching units may be arranged in cascade configuration. Further, each one of the switching units may be individually operated in response to the input power of each one of the switching units and e.g. the target waveform and/or output waveform. The individual control of the cascaded switching units allows for a possibility to individually adapt the switching units to the actual input power, which e.g. may be provided from a photovoltaic panel. In case the power inverter system is used with photovoltaic panels, each one of the plurality of switching units may be individually controlled such that each one of the respective photovoltaic panels is operated at their respective optimum working points. The current-voltage (I-V) characteristics of a photovoltaic panel may be non-linear. Along this I-V curve, an optimum working point, or maximum output power point, of the photovoltaic panel can be found for a certain current and a certain voltage level. Thus, the photovoltaic panel may deliver a maximum (or at least near-maximum) output power when a proper load is applied to the photovoltaic panel. This may e.g. be achieved by using Maximum Power Point Tracking (MPPT), wherein the optimum working point of each photovoltaic panel is determined by monitoring the respective power output at various photovoltaic panels.

The voltage equaliser may e.g. be operated based on parameters relating to number of switching units, the operation or performance of individual switching units, desired frequency components of the output AC, and the performance of individual input power sources such as e.g. photovoltaic panels.

It should be realised that the plurality of switching units in cascade configuration may be referred to as a DC/AC inverter adapted to convert input DC from a plurality, or array, of DC sources such as e.g. photovoltaic panels into a combined output. Each one of the switching units may comprise an H-bridge converter having e.g. four metal oxide semiconductor field transistors (MOSFETs) or insulated gate bipolar transistors (IGBTs) or any other type of suitable semiconductor switches/transistors, and may be controlled by a control circuitry comprising e.g. a microcontroller, FPGA or analogue circuits.

The voltage equaliser may be adapted to be integrated with a photovoltaic panel, in e.g. a junction box. Such a junction box may also be adapted to accommodate one or several switching units.

According to an embodiment, at least some of the switching units may be connected to other dc power sources, such as for example batteries.

According to an embodiment, the combined output voltage may be supplied to a primary side of a transformer having a secondary side connected to the grid. The transformer may be used for transforming the overall voltage level of the output to a required voltage level matching e.g. the grid voltage level.

According to an embodiment, the output of the voltage equaliser may be supplied to a primary side of a transformer having a secondary side connected in series with the string of switching units. The transformer may be used for transforming (such as increasing or decreasing) the voltage level of the output from the voltage equaliser to a voltage level required for matching e.g. the grid voltage waveform.

In a third aspect, a method in a power inverter system is provided. The power inverter system comprises a plurality of switching units that are electrically connected to each other in cascade configuration. Each of the switching units is adapted to receive a respective input power. Further, each of the switching units is operable in an inverter mode in which the switching units are individually switched so as to produce a combined output voltage waveform, and a communication mode in which the switching units are switched so as to produce a communication signal. The combined output voltage from the switching units and the communication signal may be transferred on the same wire or line. According to the present aspect, at least some of the switching units are in the inverter mode switched in response to switching commands of a command signal and/or other types of information provided by e.g. a data signal. Further, at least one of the switching units is operated in the communication mode during a period of time defined by two consecutive switching commands of the command signal.

According to a fourth aspect, a method in a central unit is provided. The method comprises the steps of receiving, via a common line adapted to transferring both power and communication data, a communication signal generated by a switching unit operating in a communication mode, calculating a command signal based on the received communication signal, and outputting the command signal via the common line. The switching unit is one of a plurality of switching units electrically connected in cascade configuration, wherein each one of the plurality of switching units is adapted to receive a respective input DC power and operable in an inverter mode and a communication mode. In the inverter mode the switching units are individually switched in response to switching commands of the command signal so as to produce a combined output voltage waveform and current transferred on the common line. In the communication mode, in which the switching units are operable between two consecutive switching commands of the command signal, the switching units are switched to produce the communication signal.

According to a fifth aspect, a power inverter system is provided comprising a plurality of switching units electrically connected in cascade configuration. Each one of the plurality of switching units is adapted to receive a respective input DC power and operable in an inverter mode in which the switching units are individually switched in response to switching commands of a command signal so as to produce a combined output voltage and current waveform transferred on a common line. Further, the switching units are operable, between two consecutive switching commands of the command signal, in a communication mode in which the switching units are switched so as to produce a communication signal, wherein the communication signal is transmitted in the common line.

According to a sixth aspect, a central unit is provided which is adapted to receive, via a common line, a communication signal generated by a switching unit according to the fifth aspect. The communication signal is processed by a processor adapted to calculate a command signal based on the received communication signal. The central unit further comprises a communication interface through which the command signal is output to the common line.

According to a seventh aspect, a system is provided comprising a power inverter system according to the fifth aspect and a central unit according to the sixth aspect.

The present third to seventh aspects make use of an understanding that the multilevel output voltage waveform can be built up and designed so there are "silent" periods where the voltage is relatively constant and has a relatively low harmonic content. Those "silent" periods may be located between two consecutive switching events of the switching units. These "silent" periods may be utilized for transmitting a superimposed communication signal on the combined output and with a relatively low harmonic content (i.e., noise) that otherwise may be caused by level transients. The communication signal may be achieved by switching one or several of the switching units while letting the remaining switching units be silent, i.e., remain in its present state as the communication signal is generated.

The switching units may, in other words, be considered to operate in two different modes—the inverter mode generating the combined multilevel output voltage and current waveform and at the same time be able to receive the communication signal and the communication mode generating the communication signal. In the inverter mode each or at least some of the switching units may be switched based on switching commands of the command signal so as to form a desired multilevel output voltage and current waveform and simultaneously be able to receive communication data and commands from the central unit. The period defined by two mutually adjacent switching commands may be referred to as a silent period of the multilevel output AC, as the output may be relatively stable or constant during this period. In other words, the output voltage may during this silent period have a relatively low noise, which is particularly advantageous in connection with signaling as a relatively low level of noise may reduce the need for filtering and amplification of the communication signal. In this silent period, one or several of the switching units may be operated in the communication mode, in which they may be switched a plurality of times to generate a superimposed communication signal. Preferably, the switching units may be operated at a relatively low switching frequency in the inverter mode as compared to commonly known topologies where a high frequency is used and desired in order to reduce the size of filter components. By operating the power inverter system at relatively low frequencies, relatively long periods between consecutive switching events may be available for generation and transmission of the communication signal. Further, a lower switching frequency may allow for reduced switching losses and hence an inverter with increased efficiency.

The command signal may e.g. comprise a state command causing a switching unit to output or receive power, and preferably to output a voltage at a certain level (positive, zero, negative or voltages there between). Additionally, or alternatively, the state command may cause the switching unit to cease outputting power and voltage. The command signal may also comprise further or alternative commands causing the switching units to output any combination of two or more of a positive voltage, a negative voltage, zero voltage and voltages there between. This also applies when operated in the communication mode, wherein the switching unit may alternate between any of the above mentioned outputs.

Each one of the plurality of switching units may be adapted to receive, via the common line, a communication signal generated by another switching unit or the central unit. The communication signal may be processed by a processor adapted to calculate a command signal based on the received communication signal.

By using the common line for signaling a number of advantages may be achieved. For instance, the need for separate communication channels is eliminated. Additional cabling or wireless communication means may therefore be omitted. Further, by using an existing power stage in the switching units there is no need for an additional communication stage or transmitter for generating the communication signal. Instead the same equipment generating the output voltage waveform and providing the power conversion can be used for the additional purpose of communication, which allows for a reduced bill of material, size and cost related to e.g. manufacturing and maintenance.

The communication signal may comprise information relating to voltages or currents in the system, such as the level of DC input to the switching unit or the level of output AC, and other parameters relating to e.g. temperature, capability and performance of the switching unit.

The central unit may use information in the communication signal when determining or calculating the command signal. Information regarding the current state or operation of the inverter system or its input may hence be used as feedback for controlling the inverter system.

The central unit may further be adapted to receive information representing at least one of frequency, phase, amplitude and harmonics of a required AC, such as e.g. a grid AC, and to receive information, via the communication signal, representing at least one of input current and input voltage to each one, or at least some, of the switching units. Based on the received information, the switching units may be individually controlled such that the combined output from the plurality of switching units produces a voltage and current waveform matching the required voltage and current waveform.

The individual control of the switching units is particularly relevant for applications and systems wherein the respective input DC power varies over time and/or is difficult to predict. This may be the case in for e.g. photovoltaic (PV) elements or solar panels, wherein the output power may be determined by a non-linear relationship between voltage and current of the DC input. Events like a passing shadow, or differences in panel performance due to pollution, differential aging or differences during manufacturing may hinder an array of panels as whole to operate at its peak efficiency point. The present third to seventh aspects provide a solution wherein each panel may be connected to a respective switching unit that is cascaded and can be individually operated in response to the input DC power from each one of the panels. Information about the input DC power may be transferred by the communication signal to the central unit, wherein a micro-controller or processor may be provided to generate a suitable command signal indicating a switching pattern to be used by the switching units.

The present third to seventh aspects further allow for individual input DC power sources, such as e.g. solar panels, to be monitored. Monitoring energy production (i.e. produced input DC power, voltage and/or current) may e.g. give an operator or maintenance personnel an early indication regarding need for maintenance, resulting in better utilization of the equipment. The monitoring may be accomplished by means of the communication signal, which may be transmitted to the central unit for further analysis.

The present inventive concept may thus be realized as a method in a power inverter system comprising a central unit and a plurality of switching units electrically connected in cascade configuration, wherein the central unit is adapted to receive, via common line or common AC power path, a communication signal, and to output, to the common line, a command signal comprising switching commands. Further, each one of the plurality of switching units may adapted to receive a respective input DC power and to operate in an inverter mode in which they are individually switched in response to the switching commands of the command signal so as to produce a combined output AC transmitted in the common line. Further, each one of the plurality of switching units may be operable, between two consecutive switching commands of the command signal, in a communication mode in which the switching units are switched so as to produce the communication signal, the communication signal being transmitted in the common line. The inverter system may also comprise a voltage equalizer, e.g. comprising an energy storage element adapted to be connected to the common AC power path to receive the combined output waveform, be charged by the combined output power, and add voltage to the combined output power. The voltage equalizer may comprise a measuring unit adapted to measure a voltage of the combined output power waveform, a calculating unit adapted to determine a difference between the measured voltage and a voltage of a target power waveform, and control circuitry adapted to add, to the combined output power waveform, a voltage corresponding to the determined difference.

Such a power inverter system and method represent an improved technology for providing an output alternating voltage matching a target alternating voltage, and wherein the communication within the system, e.g. between the switching units, may be achieved without using a separate or dedicated communication channel. This is advantageous over prior art systems, wherein the individual operation of the switching units e.g. may be effectuated by means of a switch control circuitry that requires transmission of information between the units of the system using e.g. a wireless communication channel. Further, a target matched output alternating voltage may according to the present inventive concept be provided in the common line together with a communication signal which may a substantially higher bandwidth compared to the switching frequency at which the switching units are operated in the inverter mode to generate the combined output AC. In addition, it will be realised that the above described communication method may be used for communicating with, and possibly operating, the voltage equaliser.

Thus, the present inventive concept may provide a complete system for transferring power from a plurality of DC sources, such as e.g. an array of photovoltaic panels, to e.g. the power grid, and wherein the communication within the system may be efficiently realised by using the existing switching units and the common line.

According to an embodiment, the communication signal further comprises an identifier indicating an identity of the switching unit producing the communication signal. The central unit may thereby be able to distinguish between individual switching units and hence to adapt the command signal accordingly.

According to an embodiment, each one of the switching units may comprise a sensor adapted to receive the command signal and/or the communication signal. The sensor may, in case of a current being the main information carrier for, e.g. comprise means for sensing changes in current, for example a signal transformer, a current transformer, a shunt resistor or a Hall-effect measurement device. Further, one or several of the power stage transistors on-resistance or conduction voltage drop may be used for sensing the communication signal. The communication signal may, in case of the main information carrier being a voltage, be determined by means of a sensing device detecting changes in voltage. Such a sensing device may e.g. utilize resistive voltage dividers combined with AC coupling in the form of e.g. capacitors.

Alternatively, or additionally, the sensor may comprise a common mode inductor having a core with a first winding and a second winding, wherein the first winding and the second winding forms a differential pair of conductors arranged to convey a differential communication signal. Such a common mode inductor may comprise a third winding arranged to extend along at least a portion of the first winding and a fourth winding arranged to extend along at least a portion of the second winding. The third winding and the fourth winding may be inductively coupled to the first winding and the second winding, respectively, and be connected in series with each other so as to provide a sensor signal induced by the differential communication signal in the first winding and the second winding.

According to some embodiments, the central unit may comprise communication interface adapted to output the command signal and/or to receive the communication signal. The communication interface may e.g. comprise a transmitter having a switching unit which may be similarly configured as the one already discussed. Such a switching unit may be adapted to generate a signal, such as a command signal, in the silent periods between two switching commands. Alternatively, or additionally, the communication interface may according to some embodiments comprise a sensor, such as e.g. a transformer, resistor, a Hall-effect measurement device, or a transistor as mentioned above, for receiving and determining the communication signal. Further, a common mode inductor with an additional sensor winding as described above may be used.

A switching unit may, in the context of the present application, refer to an electric component capable of receiving input DC power and producing a multilevel output of at least two different voltage levels or more. The switching unit may also be referred to as a DC/AC converter and may e.g. be formed of an H-bridge or half bridge converter. The H-bridge converter may e.g. comprise four metal oxide semiconductor field effect transistors (MOSFETs) or any other type of semiconductor switch or transistor. The half bridge converter may e.g. comprise two transistors.

It will be appreciated that the present aspects may be implemented in, or realised as a low-frequency or high frequency, high-power transmission system.

The present aspects may be embodied as computer-readable instructions for controlling a programmable computer in such manner that it performs the method outlined above. Such instructions may be distributed in the form of a computer-program product comprising a computer-readable medium storing the instructions. In particular, the instructions may be loaded in a micro-controller connected to the voltage equaliser.

Further objectives of, features of and advantages with the present aspects will become apparent when studying the following detailed disclosure, the drawings and the appended claims. In particular, it will be appreciated that the method and system according to the first and second aspects may be combined with various types of electronic filter topologies according to the third to seventh aspects. Those skilled in the art realize that different features of the present aspects, even if recited in different claims, can be combined in embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention. Reference will be made to the appended drawings, on which.

All the figures are schematic and generally only show parts which are necessary in order to elucidate the invention, whereas other parts may be omitted or merely suggested.

DETAILED DESCRIPTION OF EMBODIMENTS

Figure 1:
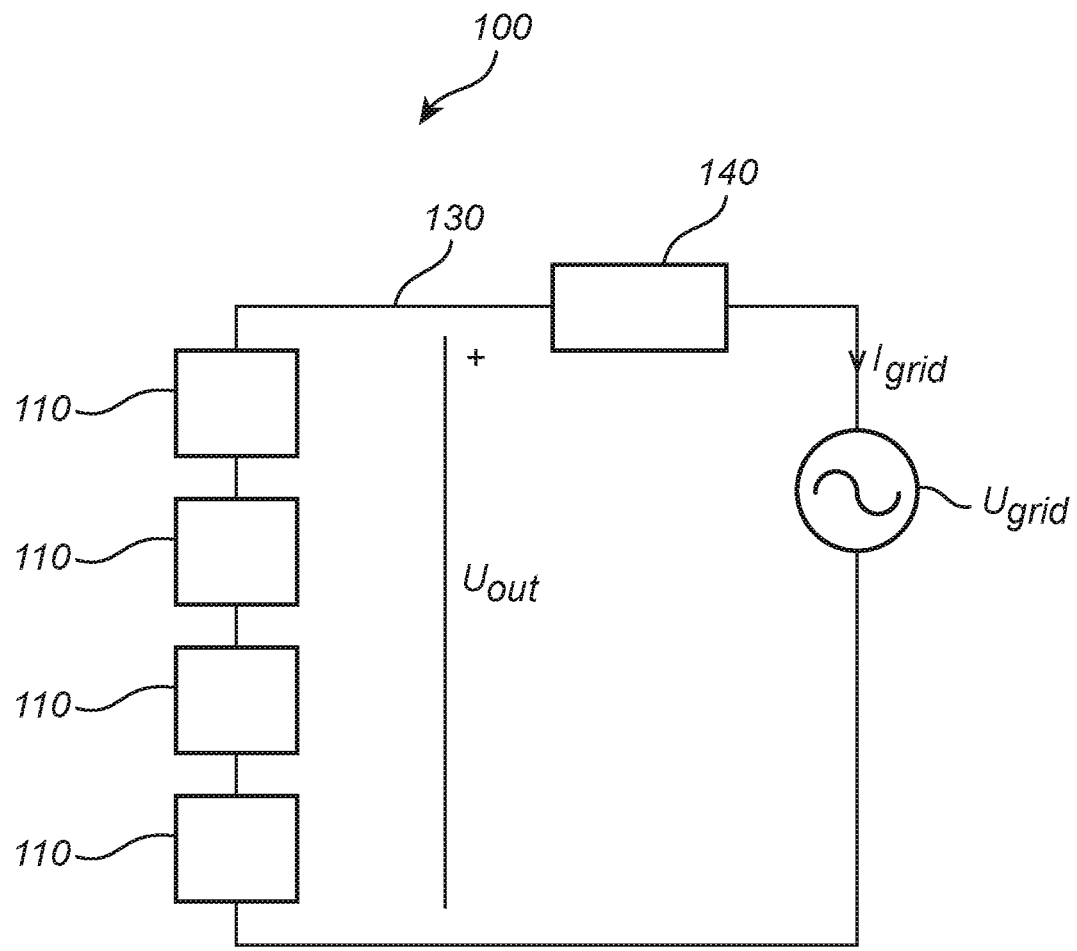
FIG. 1 is a diagram illustrating the basic topology of an inverter system connected to a target voltage source.

FIG. 1 schematically illustrates the basic topology of a power inverter system 100, comprising a plurality of switching units 110 that are interconnected to produce a combined output voltage $U_{OUT}$. The combined output voltage $U_{OUT}$ may be supplied via a common line 130 and combined with a target voltage, such as e.g. a grid voltage $U_{GRID}$ (or a target current $I_{GRID}$). As indicated in FIG. 1, a filter 140 may be added between the inverter system and the grid for reducing undesired harmonics in the output voltage $U_{OUT}$ and/or target voltage $U_{GRID}$.

Figure 2:
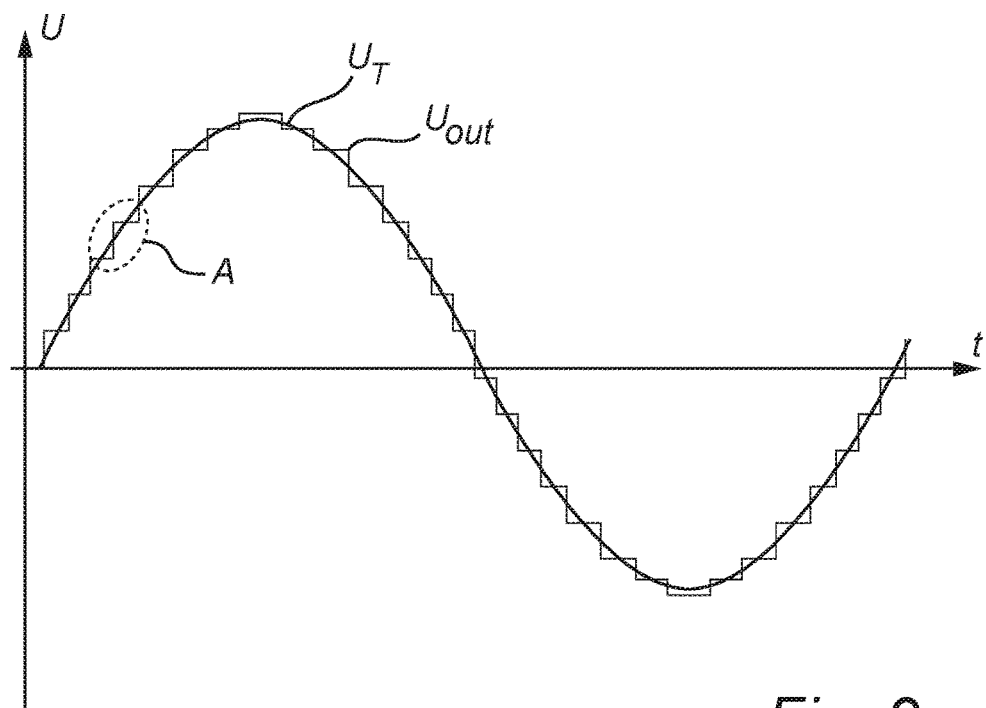
FIG. 2 is a diagram illustrating a combined multilevel output voltage from a power inverter system and voltage equaliser according to an embodiment.

With reference to FIG. 2, is a diagram illustrating a combined multilevel output voltage waveform $U_{OUT}$ from a switched power inverter system is depicted. The combined output voltage waveform $U_{OUT}$ (vertical axis) is indicated as a stepped waveform as a function of time t (horizontal axis). The combined output voltage waveform $U_{OUT}$ may e.g. be generated by a plurality of switching units (not shown in FIG. 2) that e.g. may be arranged in a cascaded configuration. The required voltage waveform or target voltage waveform $U_T$ is in FIG. 1 indicated by a sinusoidal waveform. Due to the stepped nature or staircase shape of the waveform of the combined output voltage waveform $U_{OUT}$, the momentaneous value of the combined output voltage waveform $U_{OUT}$ may at a given point in time be larger, equal to or smaller than the target voltage waveform $U_T$. The better matching between the output voltage waveform $U_{OUT}$ and the target voltage waveform $U_T$, the smaller absolute voltage difference between the output voltage waveform $U_{OUT}$ and the target voltage waveform $U_T$. Ideally, the difference will approach zero for increasing switching frequencies, thereby providing an ideal matching. It may however be desirable to use an as low as possible switching frequency in the switching units in order to limit e.g. switching losses and/or emitted noise.

Figure 3:
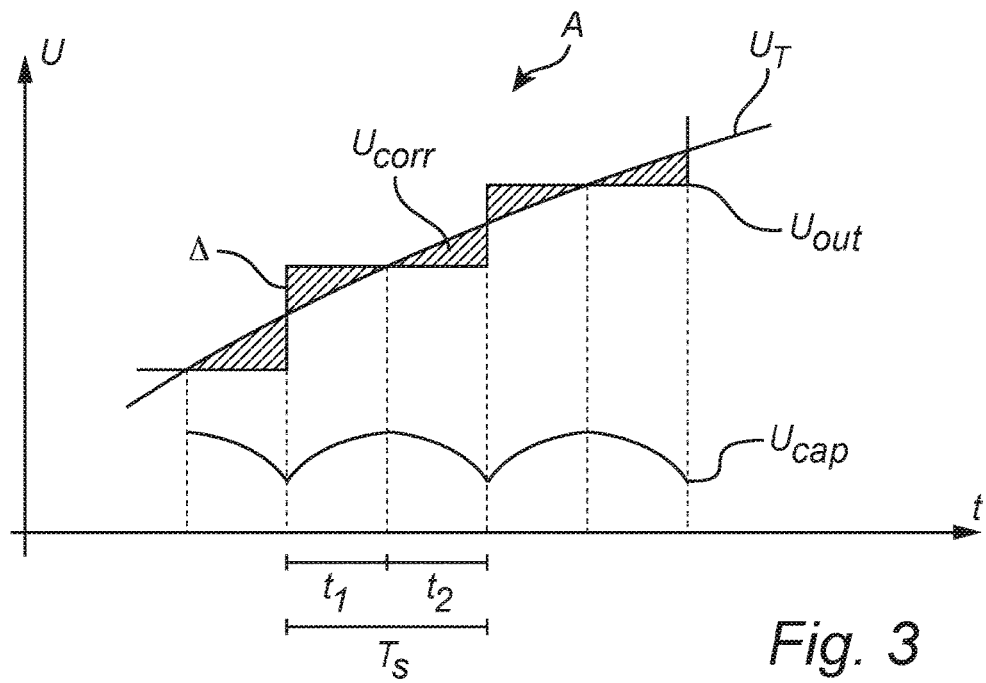
FIG. 3 is a diagram indicating the energy and voltage added to and/or discharged from the energy storage element of a voltage equaliser according to an embodiment.

FIG. 3 is a diagram illustrating the difference in voltage that needs to be added or subtracted to the output voltage waveform. Energy is either added to and/or discharged from the energy storage element (not shown in FIG. 3) of the voltage equaliser. The voltage level $U_{CAP}$ (vertical axis) is indicated as a function of time t (horizontal axis). The inset A represents a portion of the multilevel output voltage waveform $U_{OUT}$ and target voltage waveform $U_T$ in FIG. 2, and indicates an exemplifying operation of the energy storage element in the case a capacitor is used based on a measured difference Δ between a voltage of the output voltage waveform $U_{OUT}$ and a voltage of the target voltage waveform $U_T$. During a time period $t_1$, for which a voltage of the output voltage waveform $U_{OUT}$ may exceed the voltage of the target voltage waveform $U_T$, the energy storage unit may be charged so as lower the voltage level of the output voltage waveform $U_{OUT}$, thereby allowing the output voltage waveform $U_{OUT}$ to better match the target voltage waveform $U_T$. Similarly, during a time period $t_2$, for which a voltage of the output voltage waveform $U_{OUT}$ is below the target voltage $U_T$, the energy storage unit may be discharged to the output voltage waveform $U_{OUT}$ such that the matching between the output voltage waveform $U_{OUT}$ and the target voltage waveform $U_T$ may be improved. The resulting adjustment $U_{CORR}$ is indicated by a hatched region in FIG. 2.

Figure 4A:
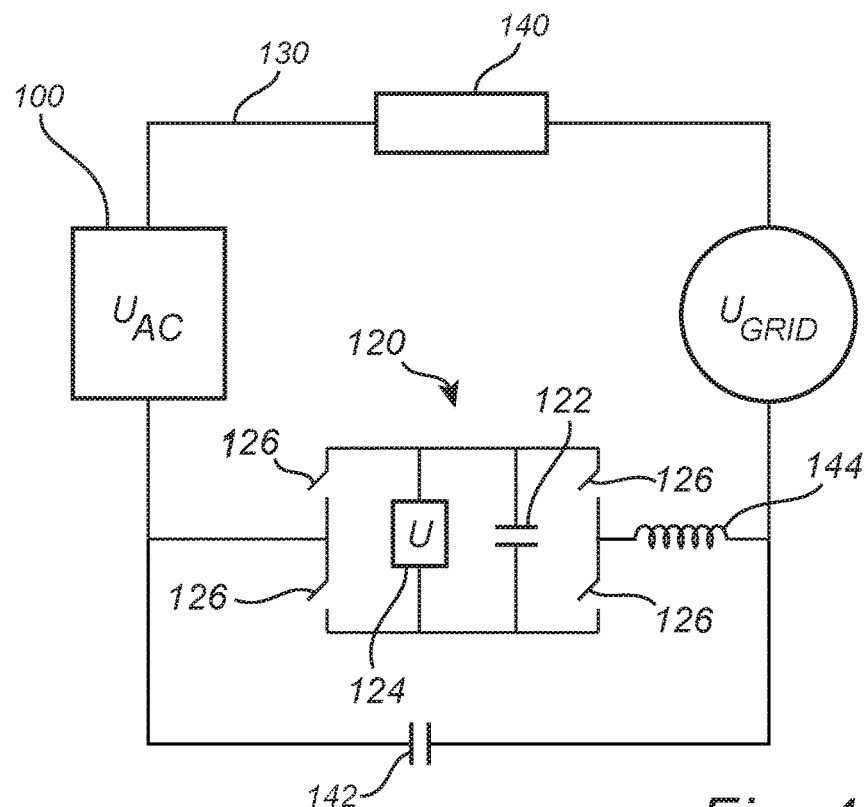
FIGS. 4a-c schematically illustrates layout examples of power inverter systems and voltage equalisers according to some embodiments, wherein the power inverter systems comprises a plurality of cascade connected switching units.

FIG. 4a shows a power inverter system 100 and an example of a voltage equaliser 120 according to an embodiment. The power inverter system is adapted to generate a combined output voltage waveform $U_{AC}$ that may be fed via a common line 130 to e.g. a grid having a grid voltage $U_{GRID}$. The voltage equaliser 120 may be connected in series with the power inverter system generating the output voltage waveform $U_{AC}$ and adapted to adjust the output voltage waveform $U_{AC}$ to the target voltage waveform $U_T$, such as the grid voltage waveform $U_{GRID}$. The voltage equaliser 120 may be represented by a capacitor 122 and a voltage source 124, which may be connected to the common line 130 via one or several switches 126. Further, a preferably passive filter 142, 144 may be added to filter the output voltage waveform output to the grid $U_{GRID}$. The filter may e.g. be formed of a capacitor 142 connected in parallel with the voltage equaliser 120 and an inductance 144 connected in series with the voltage equaliser 120.

Figure 4B:
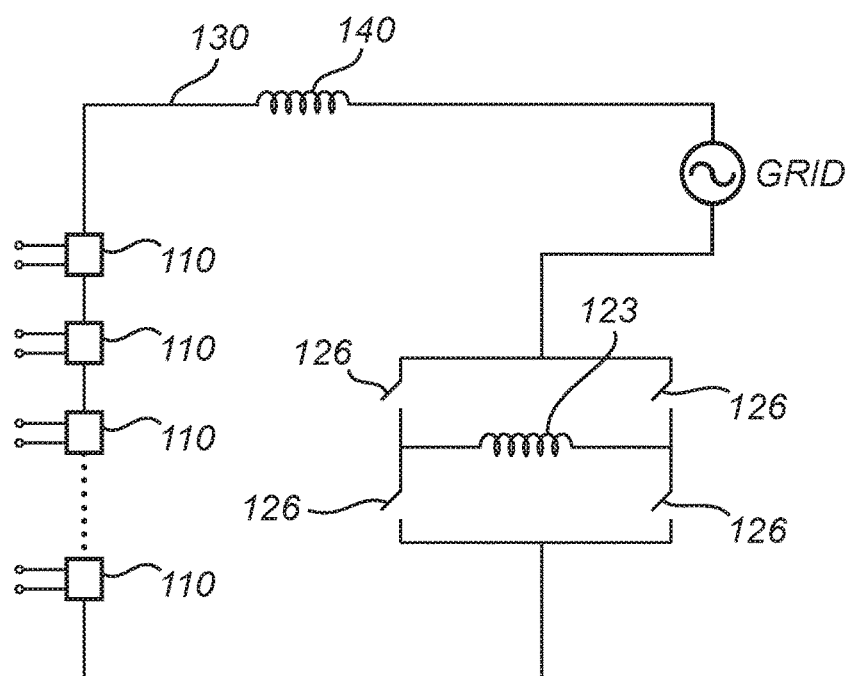

FIG. 4b shows a power inverter system 100 and an example of a current mode equalizer 120 according to an embodiment that may be similarly configured as the power inverter system and voltage equaliser as discussed with reference to FIG. 4a. The power inverter system is adapted to generate a combined output voltage waveform $U_{AC}$ that may be fed via a common line 130 to e.g. a grid having a grid voltage $U_{GRID}$. The current mode equaliser 120 may be represented by an inductor 123 and electrical switches 126, which may be connected to the common line 130. In this implementation the energy is stored in an inductor 123 instead of a capacitor.

Figure 4C:
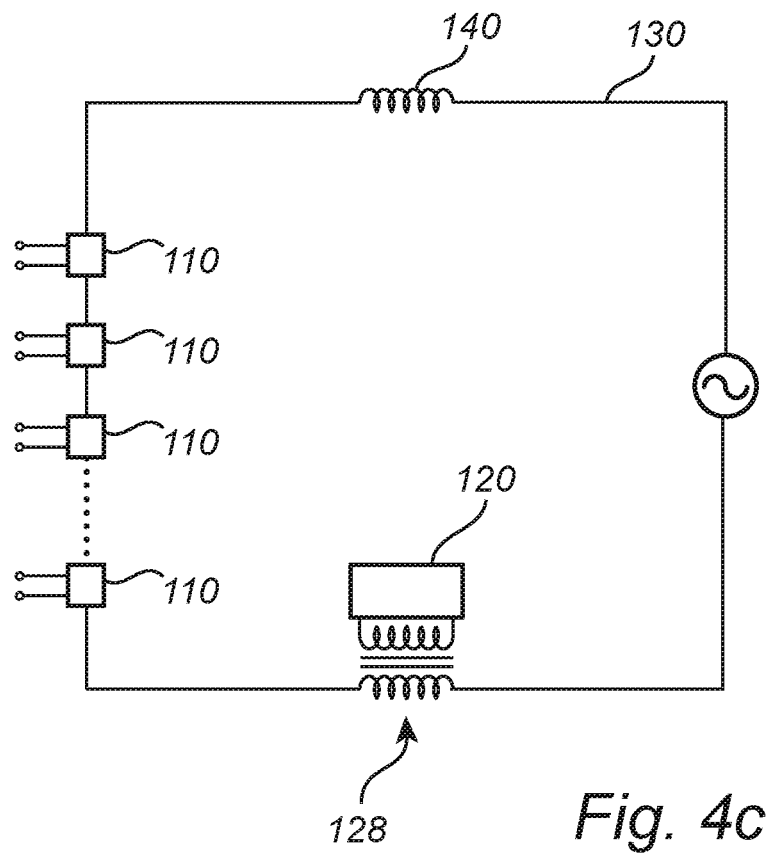

FIG. 4c shows a power inverter system 100 similar to the power inverter systems described with reference to FIGS. 4a and b, wherein a transformer 128 may be used to connect the output of the voltage equaliser or filter 120 to the systems main power path, i.e., the common line 130.

It will however be appreciated that other implementations of the voltage (or current) equaliser are conceivable as well. The voltage equaliser may in some examples be implemented either with or without the possibility of retaining the energy, for example by means of different DC/DC topologies.

Figure 5:
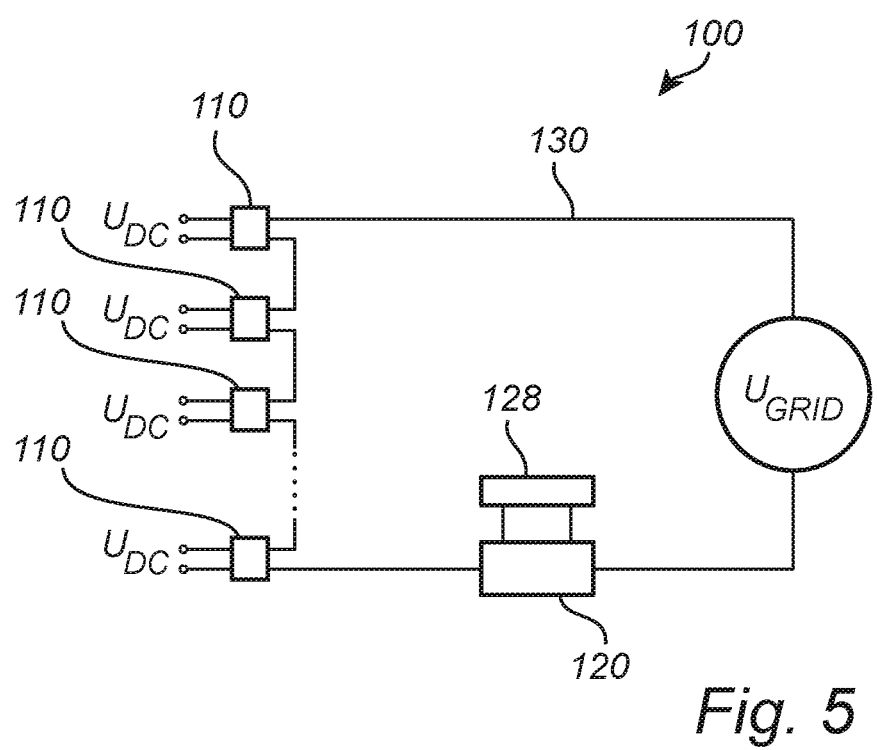
FIG. 5 schematically illustrates the layout of a power inverter system and an example of a voltage equaliser according to an embodiment.

FIG. 5 shows a power inverter system 100 and a voltage equaliser 120 similarly configured as the embodiments described with reference to FIGS. 2 to 4. The power inverter system 100 may comprise a plurality of switching units, such as e.g. H-bridge converters 110, each being arranged to be supplied with an input DC $U_{DC}$ from a respective source, such as e.g. a photovoltaic element (not shown in FIG. 5). The H-bridge converters 110 may be cascaded to produce a multilevel output voltage $U_{OUT}$, which may be fed via the common line 130 and the voltage equaliser 120 to an output terminal adapted to be connected to e.g. the grid.

The voltage equaliser 120 may comprise a microcontroller 128 for controlling the operation of the voltage equaliser 120 in such manner that the power inverter system 100 produces a corrected output voltage waveform $U_{CORR}$ having an improved matching to the required voltage waveform $U_T$. The microcontroller 128 may operate the voltage equaliser 120 based on a measured current or voltage of the output voltage waveform $U_{AC}$, a predetermined operation scheme, and/or parameters relating to e.g. the performance or operation of the switching units 110.

Figure 6:
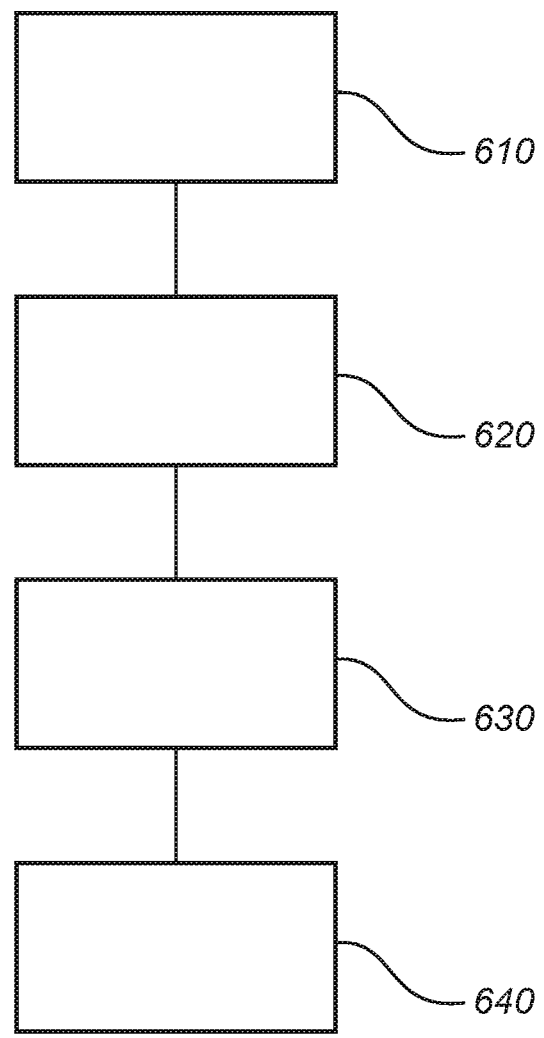
FIG. 6 illustrates the outline of a method for generating a combined output AC in a power inverter system according to an embodiment.

FIG. 6 shows a schematic outline of a method according to an embodiment, wherein a plurality of switching units produce a combined output voltage waveform according to the embodiments described with reference to FIGS. 2 to 5. The switching units may be connected to a voltage equalizer comprising an energy storage element capable of storing and discharging energy that may be taken from or added to the combined output voltage waveform.

According to the present embodiment, the method may comprise the steps of measuring 610 a voltage of the combined output voltage waveform, e.g. by means of a measuring unit communicatively connected to e.g. a microcontroller for controlling the voltage equaliser, and determining 620, by means of a calculating unit, a difference between the measured voltage and a voltage of a target voltage waveform. The determined difference may be used as input to e.g. a control circuitry adapted to charge 630 the energy storage element in case the measured voltage or difference exceeds a predetermined voltage level, and to discharge 640 the energy storage element in case the measured voltage or difference is below a predetermined voltage level, the voltage of the target voltage waveform.

Figure 7:
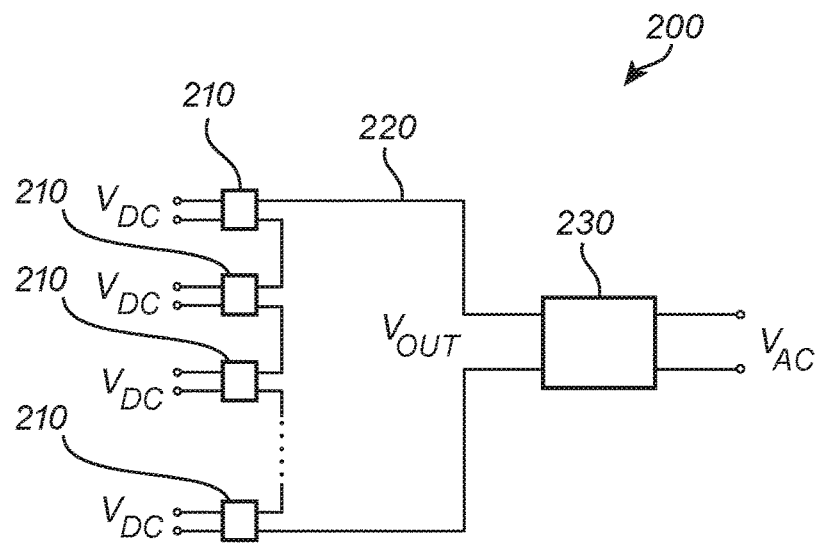
FIG. 7 graphically illustrates a power inverter system comprising a plurality of cascaded switching units, and a central unit according to some embodiments.

FIG. 7 shows a power inverter system 200 and a central unit 230 according to an embodiment. The power inverter system 200 comprises a plurality of switching units, such as e.g. H-bridge converters 210, each being arranged to be supplied with an input DC power source voltage $V_{DC}$ from a respective source, such as e.g. a photovoltaic element (not shown in FIG. 7). The H-bridge converters 210 may be cascaded to produce a multilevel output voltage $V_{OUT}$, which may be fed via the common line 220 to the central unit 230. The central unit 230 may be adapted to output a voltage $V_{AC}$ matching e.g. the grid alternating voltage and feed an output current $I_{AC}$ to e.g. the grid. In case of the input voltage sources being photovoltaic panels, each H-bridge converter 210 may be integrated in e.g. a junction box of the respective panel. Further, a central adaptation unit may be provided (not shown) for adapting the combined multilevel output voltage waveform such that a voltage similar to the grid voltage $V_{AC}$ is output from the system. The central adaptation unit may e.g. be realized by means of an inductor for taking up a possible voltage mismatch between the system and the grid voltage $V_{AC}$, and to provide an impedance which may be used for controlling and stabilizing the output current.

Each one of the switching units 210 may be adapted to operate in a communication mode wherein silent periods of the combined output voltage waveform $V_{OUT}$, i.e., in periods where no switching occurs, are utilized for generating a communication signal. The communication signal may be superimposed on the combined output voltage waveform $V_{OUT}$ and transmitted via the common line 220 to the central unit 230.

Further, the central unit 230 may be adapted to generate a command signal for controlling the operation of the H-bridges 210. The command signal may be generated in a similar way as the communication signal, i.e., by means of a switching unit (not shown) switching during a silent period of the combined output voltage waveform $V_{OUT}$.

The communication signal may e.g. comprise information indicating a current level or voltage level of the input $V_{DC}$ at the respective switching unit 210. Further, the communication signal may comprise an identifier indicating the identity of the switching unit 210 generating the communication signal. This information and/or other information may be used at the central unit 230 for controlling the operation of the power inverter system 200.

Figure 8:
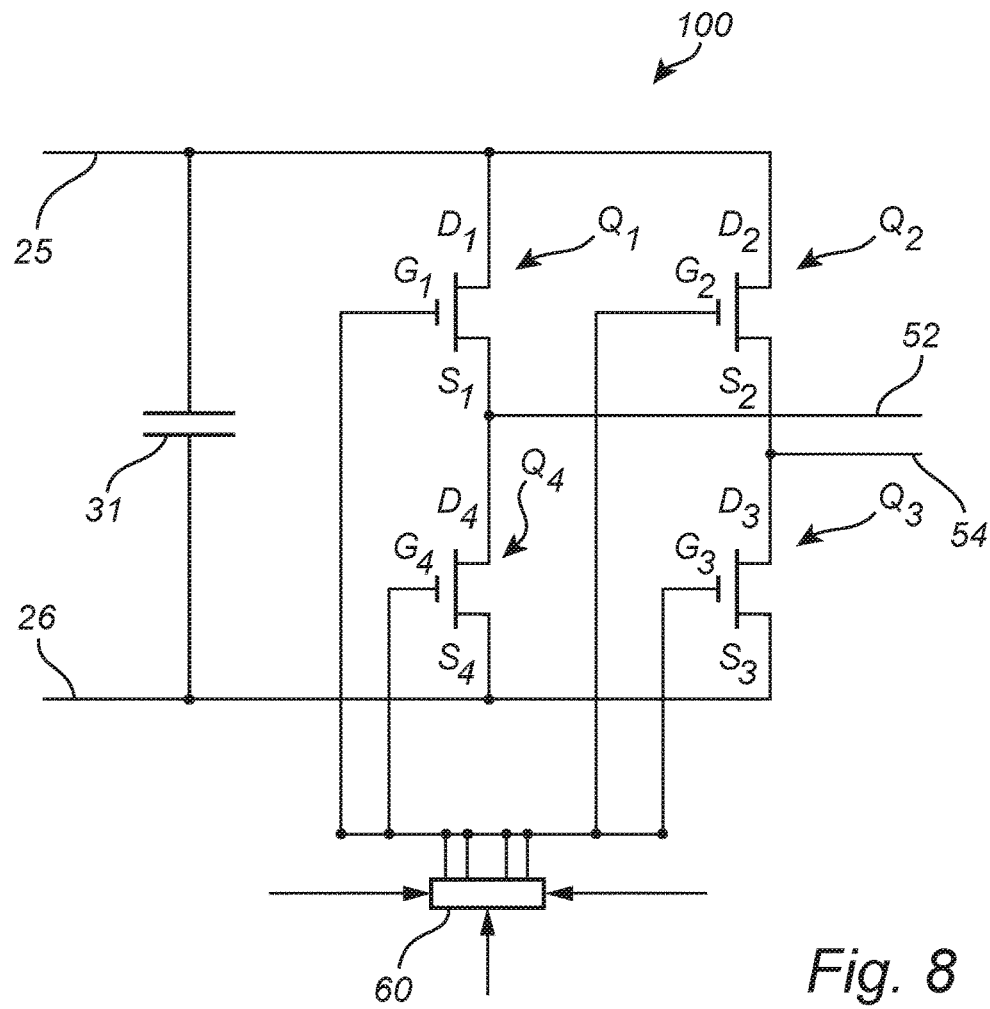
FIG. 8 shows a switching unit according to an embodiment.

FIG. 8 shows an exemplifying embodiment of a switching unit 210 according to the embodiment discussed with reference to FIG. 7. More specifically, a circuit diagram of an H-bridge converter 21, comprising four switching elements Q1, Q2, Q3, Q4 in the form of four metal oxide semiconductor field effect transistors (MOSFETs) Q1, Q2, Q3, Q4, is shown. However, any other appropriate switching element may be used, such as insulated gate bipolar transistors (IGBTs), or bipolar junction transistors (BJTs).

The drain D1 of the first transistor Q1 and the drain D2 of the second transistor Q2 may be electrically connected to a positive pole 25 of an input DC power source, such as e.g. a photovoltaic panel (not shown), while the sources S1 and S2 of the respective first and second transistors Q1 and Q2 may be electrically connected to the drains D4 and D3 of the fourth and third transistors Q4, Q3, respectively. The sources S3 and S4 of the third and fourth transistors Q4, Q3 may be electrically connected to a negative pole 43 of the input DC power source. The source S1 of the first transistor Q1 may be electrically connected to the drain D4 of the fourth transistor Q4 at a first output terminal 52, whereas the source S2 of the second transistor Q2 is electrically connected to the drain D3 of the third transistor Q3 at a second output terminal 54.

The gate terminals G1, G2, G3, G4 of the four transistors Q1, Q2, Q3, Q4 may be electrically connected to a switch control circuitry 60 adapted to control the MOSFETs Q1, Q2, Q3, Q4 by supplying a gate voltage to their respective gates G1, G2, G3, G4. The switch control circuitry may comprise a micro-controller or computing unit 60, e.g. mounted on a printed circuit board (not shown) along with the switching unit 210. The micro-controller or computing unit 60 may also be connected to e.g. current and/or voltage meters (not shown) providing the micro-controller with information on the input voltage and current, the combined output from the power inverter system 200 and/or a required AC voltage waveform or current.

The micro-controller 60 may be adapted to operate the switching units 210 in the inverter mode in such manner that the combined output from the plurality of switching units 210 of the power inverter system 200 produces a combined multilevel voltage waveform matching the required voltage waveform. Further, the micro-controller 60 may operate the switching unit 210 in the communication mode, wherein the switching unit 210, in a silent period between two consecutive switching events of any of the plurality of switching units 210, may produce a communication signal. This may be achieved by means of the micro-controller 60, which may operate the switching units Q1, Q2, Q3, Q4 so as to generate output forming the desired communication signal. The micro-controller 60 may be configured to receive the command signal from the central unit (not shown in FIG. 8) and operate the switching unit accordingly in the inverter mode. The command signal may e.g. be received by means of a receiving circuitry or sensor comprising e.g. an AC coupled transformer, a current transformer, a shunt resistor, a Hall-effect measurement device, or a conduction voltage drop over a transistor (not shown).

Figure 9:
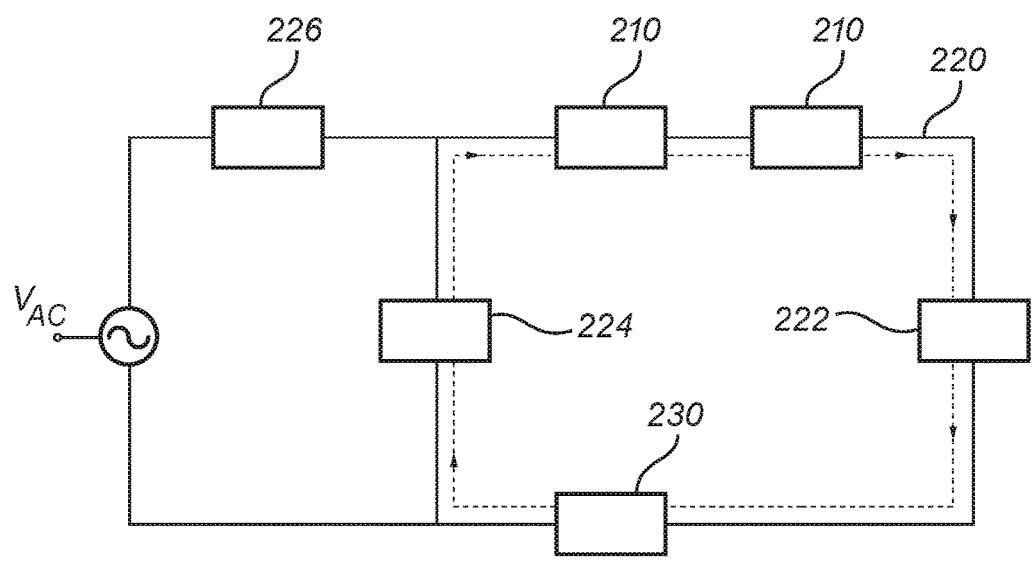
FIG. 9 schematically illustrates the layout of a system and its associated signaling paths according to an embodiment.

FIG. 9 shows a power inverter system and a central unit that may be similarly configured as the power inverter system and central unit discussed with reference to FIGS. 7 and 8. The power inverter system 200 may comprise a plurality of cascaded switching units 210 that are connected to a central unit 230 that may be adapted to receive the communication signal generated by the power inverter system 200 and to transmit a command signal controlling operation of the power inverter system 200. As indicated in FIG. 9, there might also be provided further components, such as e.g. a terminator 222 for reducing reflections of the communication signal in the common line 220. Further components may be e.g. a filter 226 for filtering the output before it is output to e.g. the grid, and a filter 224 that is arranged in the central unit 230 so as to filter the command signal. The filters 224, 226 may be structurally integrated in the central unit 230.

In FIG. 9 the communication signal and the command signal are represented by a dashed line, wherein arrows are provided to schematically indicate the path of the signals during operation of the power inverter system 200 and central unit 230. As indicated, the communication signal and the command signal may circulate from the switching units 210 of the power inverter system 200, via the common line 220 to the central unit 230, from which the command signal (which may be based in the communication signal) may be output/returned to the switching units 210. The combined output voltage waveform $V_{OUT}$ may be transmitted in the same common line 220 as the communication signal and/or the command signal, but may be further transmitted as an output AC $V_{AC}$ to e.g. the grid.

Figure 10:
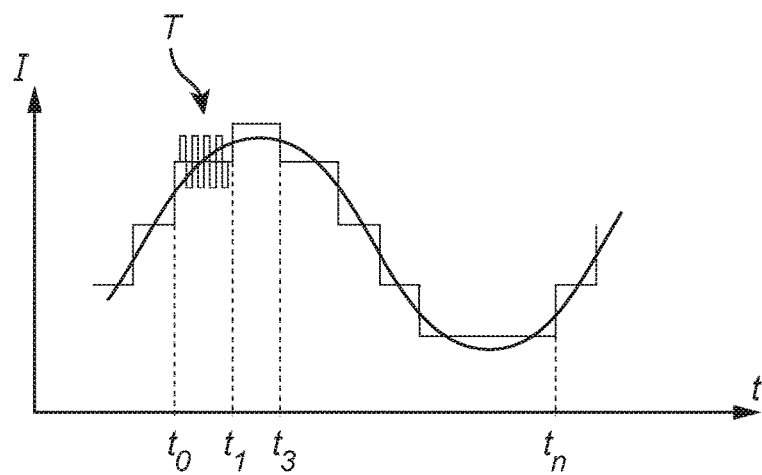
FIG. 10 is a diagram illustrating the combined multilevel output voltage waveform according to an embodiment.

FIG. 10 is a diagram illustrating a combined multilevel output voltage waveform $V_{OUT}$ from a power inverter system that may be similarly configured as the power inverter systems described with reference to any one of FIGS. 7 to 9. In the diagram, the combined output voltage waveform $V_{OUT}$ is indicated as a voltage, U (vertical axis) as a function of time t (horizontal axis). In the present, illustrative example 22 cascaded switching units are used to generate a combined multilevel output voltage waveform $V_{OUT}$ matching a desired sinusoidal voltage waveform $V_{AC}$ after filtering. The switching events of the switching units are indicated by $t_0$, $t_1$, ..., $t_n$ on the horizontal axis and may correspond to switching commands of the command signal, causing the switching units to switch between different output levels. The silent periods that can be used for signaling are schematically represented by the flat steps between two consecutive switching commands or switching events $t_n$, $t_{n+1}$. In the present figure, the communication signal is generated during silent period T between switching events $t_0$ and $t_1$. The signal may e.g. be generated by operating one of the switching units in the communication mode during that period, i.e., by switching the switching unit a plurality of times between $t_0$ and $t_1$. The communication signal may hence be superimposed on the combined multilevel output.

Figure 11:
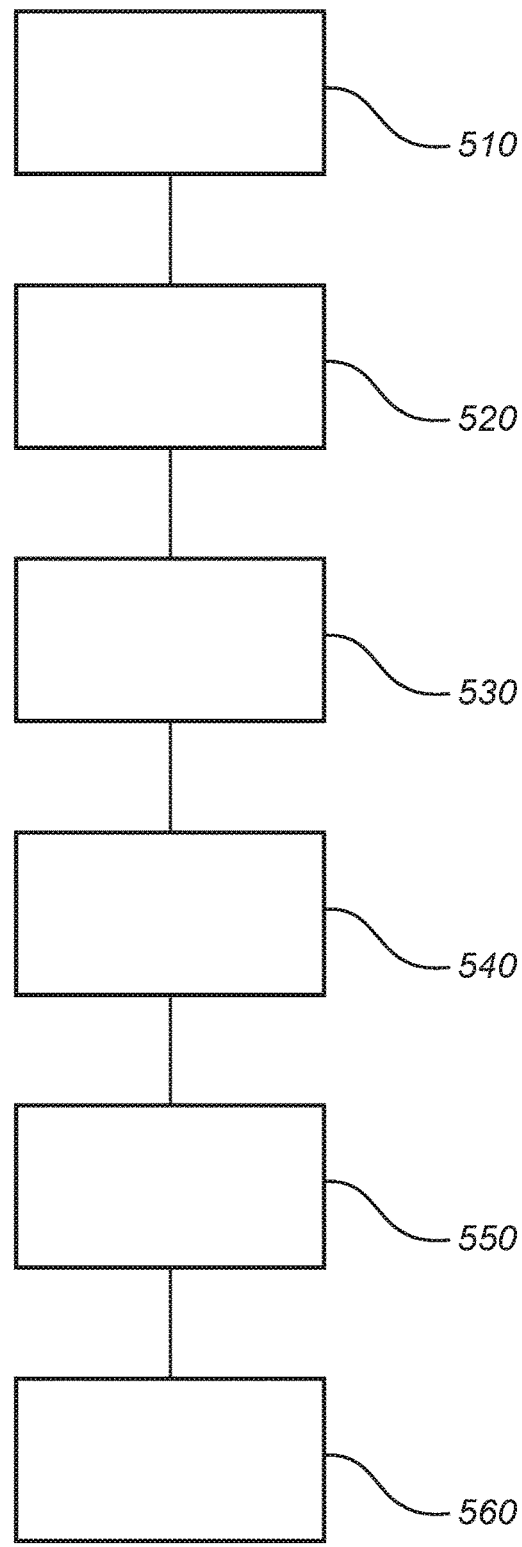
FIG. 11 illustrates the outline of a method in a power inverter system and a central unit according to an embodiment.

With reference to FIG. 11, there is shown a schematic outline of a method according to an embodiment of the present invention, wherein a power inverter system comprising plurality of switching units in cascade configuration is controlled so as to generate a communication signal and a combined multilevel output voltage waveform and AC on the same line. The method will in this example be discussed with reference to a power inverter system and a central unit similarly configured as the embodiments discussed in connection with FIGS. 7 to 10.

The method comprises operating 510 at least some of the switching units in an inverter mode in which the switching units are individually switched in response to switching commands of a command signal so as to produce a combined output voltage waveform transferred on the common line. Further, the method comprises operating 520, between two consecutive switching commands of the command signal, at least one switching unit in a communication mode in which the switching unit is switched so as to produce the communication signal, wherein the communication signal is transmitted in the common line. At the central unit, the communication signal in the common line may be received 530 and processed 540 by e.g. a micro-controller, resulting in the calculation 550 of a command signal that may be based on the received information. The command signal may be output 560, via the common line, to the inverter system.

The method illustrated by FIG. 11 and other embodiments may be embodied as computer-executable instructions distributed and used in the form of a computer-program product including a computer readable medium storing such instructions. By way of example, computer-readable media may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media typically embodies computer readable instructions, data structures, program modules or other data in a modulated data signal such as a carrier wave or other transport mechanism and includes any information delivery media.

Further, it will be appreciated that the any of the embodiments described with reference to FIGS. 1 to 6 may be combined with any of the embodiments discussed in connection with FIGS. 7 to 11.

Itemized List of Embodiments

1. A method in a power inverter system (200) comprising a plurality of switching units (210) electrically connected in cascade configuration, wherein each one of the plurality of switching units is:

adapted to receive a respective input DC power source voltage ($V_{DC}$);

operable in an inverter mode in which the switching units are individually switched so as to produce a combined output AC ($V_{OUT}$) transmitted in a common line (220); and operable in a communication mode in which the switching units are switched so as to produce a communication signal, the communication signal being transmitted in the common line;

wherein the method comprises:

operating at least some of the switching units in the inverter mode such that they are switched in response to switching commands of a command signal; and between two consecutive switching commands of the command signal, operating at least one of the switching units in the communication mode.

2. The method according to embodiment 1, wherein the communication signal comprises an identifier indicating an identity of the switching unit producing said communication signal.

3. The method according to embodiment 1 or 2, wherein the switching units are switched between a plurality of output voltages levels in the inverter mode and/or the communication mode.

4. The method according to embodiment 1 or 2, wherein the switching units are switched between a positive voltage level and a negative voltage level in the inverter mode and/or the communication mode.

5. The method according to embodiment 1 or 2, wherein the switching units are switched between a positive voltage level, a zero voltage level and a negative voltage level in the inverter mode and/or the communication mode.

6. The method according to any one of the preceding embodiments, wherein the combined output is a multilevel voltage waveform, and wherein each level of the multilevel voltage waveform is formed by an output from one of the switching units or a sum of outputs from several of the switching units.

7. The method according to any one of the preceding embodiments, wherein the switching units are individually switched such that a time period between two consecutive switching events or the switching units allow for predetermined amount of data to be output from the power inverter system.

8. A method in a central unit (230), comprising the steps of receiving, via a common line, a communication signal generated by a switching unit operating in a communication mode, wherein the switching unit is one of a plurality of switching units electrically connected in cascade configuration, and wherein each one of the plurality of switching units is:
  adapted to receive a respective input DC power;
  operable in an inverter mode in which the switching units are individually switched in response to switching commands of a command signal so as to produce a combined output AC transmitted in the common line; and
  operable, between two consecutive switching commands of the command signal, in the communication mode in which the switching units are switched so as to produce the communication signal;
  the method further comprising:
  calculating a command signal based on the received communication signal; and
  outputting, via the common line, said command signal.
9. The method according to embodiment 8, further comprising determining the received communication signal by measuring a voltage difference or electrical current.
10. A power inverter system comprising a plurality of switching units electrically connected in cascade configuration, wherein each one of the plurality of switching units is:
  adapted to receive a respective input DC power;
  operable in an inverter mode in which the switching units are individually switched in response to switching commands of a command signal so as to produce a combined output AC transmitted in a common line;
  operable, between two consecutive switching commands of the command signal, in a communication mode in which the switching units are switched so as to produce a communication signal, the communication signal being transmitted in the common line.
11. The power inverter system according to embodiment 10, wherein the switching units are H-bridge converters.
12. The power inverter system according to embodiment 10 or 11, wherein each switching unit comprises a sensor adapted to receive the command signal.
13. The power inverter system according to embodiment 11 or 12, wherein each one of the plurality of switching units is adapted to be operatively connected to a respective photovoltaic panel adapted to provide the input DC power.
14. A central unit adapted to receive, via a common line, a communication signal generated by a switching unit operating in a communication mode, wherein the switching unit is one of a plurality of switching units electrically connected in cascade configuration, and wherein each one of the plurality of switching units is:
  adapted to receive a respective input DC power;
  operable in an inverter mode in which the switching units are individually switched in response to switching commands of a command signal so as to produce a combined output AC transmitted in the common line; and
  operable, between two consecutive switching commands of the command signal, in the communication mode in which the switching units are switched so as to produce the communication signal;
  wherein the central unit further comprises:
  a processor adapted to calculate a command signal based on the received communication signal; and
  a communication interface adapted to output said command signal to the common line.
15. The central unit according to embodiment 14, further comprising a sensor adapted to determine the communication signal.
16. The central unit according to embodiment 15, wherein the sensor comprises at least one of: an AC coupled transformer, a current transformer, a shunt resistor, a Hall-effect measurement device and a conduction transistor.
17. A system comprising a power inverter system according to embodiment 11 and a central unit according to embodiment 14.
18. A power inverter system, comprising:
  a plurality of switching units electrically connected in cascade configuration, wherein each one of the plurality of switching units is adapted to receive a respective input DC power source voltage ($V_{DC}$) and wherein the plurality of switching units is adapted to produce a combined output AC ($V_{OUT}$) transmitted in a common line;
  a voltage equalizer connected to the common line and comprising an energy storage element adapted to be charged by the combined output AC and adapted to add voltage to the combined output AC, wherein the voltage equalizer is adapted to measure a voltage of the combined output AC, determine a difference between the measured voltage and a voltage of a target AC waveform, and add, to the combined output power waveform, a voltage corresponding to the determined difference; and
  a central unit connected to the plurality of switching units via the common line, wherein the central unit is adapted to receive, via the common line, a communication signal from the plurality of switching units and to output, to the common line, a command signal comprising switching commands;
  wherein each one of the plurality of switching units is:
  operable in an inverter mode in which the switching units are individually switched in response to the switching commands of the command signal so as to produce the combined output AC transmitted in the common line; and
  operable, between two consecutive switching commands of the command signal, in a communication mode in which the switching units are switched so as to produce the communication signal, the communication signal being transmitted in the common line.
19. The power inverter system according to embodiment 18, wherein the voltage equalizer comprises a control circuitry adapted to charge the energy storage element in case the measured voltage exceeds the voltage of the target power waveform, and to input voltage to the combined output power waveform in case the measured voltage is below the voltage of the target power waveform.
20. The power inverter system according to embodiment 18, wherein the energy storage element is a capacitor.
21. The power inverter system according to embodiment 18, wherein the voltage equalizer is connected in series with the plurality of switching units.
22. The power inverter system according to embodiment 18, wherein at least some of the switching units are connected to a respective photovoltaic panel.
23. The method according to embodiment 18, wherein at least one of the switching units is connected to a battery.
24. The power inverter system according to embodiment 18, wherein each one of the plurality of switching units comprises a sensor adapted to receive the command signal.
25. The power inverter system according to embodiment 18, further comprising a sensor adapted to determine the communication signal.
26. The power inverter system according to embodiment 25, wherein the sensor comprises at least one of: an AC coupled transformer, a current transformer, a shunt resistor, a Hall-effect measurement device and a conduction transistor.

27. A method in a power inverter system, comprising:
a plurality of switching units electrically connected in cascade configuration, wherein each one of the plurality of switching units is adapted to receive a respective input DC power source voltage ($V_{DC}$) and wherein the plurality of switching units are adapted to produce a combined AC ($V_{OUT}$) transmitted in a common line;
a voltage equalizer connected to the common line and comprising an energy storage element adapted to be charged by the combined output AC and adapted to add voltage to the combined output AC; and
a central unit connected to the plurality of switching units via the common line;
the method comprises the steps of:
outputting, from the central unit, a command signal comprising switching command;
operating at least some of the switching units in an inverter mode in which the switching units are individually switched to produce the combined output AC;
outputting the combined output AC to the common line;
between two consecutive switching commands of the command signal, operating at least one of the switching units in a communication mode in which the switching unit is switched to produce a communication signal;
outputting the communication signal to the common line;
receiving, at the central unit, the communication signal.
measuring a voltage of the combined output AC;
determining a difference between the measured voltage and a voltage of a target AC waveform; and
adding, to the combined output power waveform, a voltage corresponding to the determined difference.

28. The method according to embodiment 27, wherein the communication signal received at the central unit is used as feedback for producing the command signal.

29. The method according to embodiment 27, wherein the switching units are individually switched such that a time period between two consecutive switching events or the switching units allow for predetermined amount of data to be output from the power inverter system.

30. The method according to embodiment 27, wherein the step of adding the voltage corresponding to the determined difference comprises:
charging the energy storage element in case the measured voltage exceeds the voltage of the target power waveform, and
discharging the energy storage element in case the measured voltage is below the voltage of the target power waveform.

31. The method according to embodiment 27, further comprising transforming a voltage and a current output from the voltage equaliser to the combined output of an AC power path.

32. The method according to embodiment 27, wherein the target power waveform is a common grid power waveform.

The invention claimed is:

1. A method for generating a combined output power (UOUT) waveform in a power inverter system comprising
a plurality of switching units, wherein each one of the plurality of switching units is adapted to receive a respective input power (UDC) and wherein the plurality of switching units are interconnected to produce the combined output waveform transmitted in a common AC power path, and
a voltage equalizer comprising an energy storage element adapted to: be connected to the common AC power path to receive the combined output waveform, be charged by the combined output power waveform, and add voltage to the combined output power waveform,
the method comprising:
measuring a voltage of the combined output power waveform,
determining a difference between the measured voltage and a voltage of a target power waveform (UT), and
adding, to the combined output power waveform, a voltage corresponding to the determined difference.

2. The method according to claim 1, wherein the step of adding the voltage corresponding to the determined difference comprises:
charging the energy storage element in case the measured voltage exceeds the voltage of the target power waveform, and
discharging the energy storage element in case the measured voltage is below the voltage of the target power waveform.

3. The method according to claim 1, wherein the energy storage element is a capacitive energy storage element.

4. The method according to claim 1, wherein the energy storage element is an inductive energy storage element.

5. The method according to claim 1, wherein the voltage equalizer is connected in series with the plurality of switching units.

6. The method according to claim 1, wherein the plurality of switching units are arranged in cascade configuration.

7. The method according to claim 1, wherein at least some of the switching units are connected to a photovoltaic panel, respectively.

8. The method according to claim 1, wherein at least some of the switching units are connected to a battery, respectively.

9. The method according to claim 1, further comprising transforming a voltage and a current output from the voltage equaliser to the combined output of the AC power path.

10. The method according to claim 1, wherein the target power waveform is a grid power waveform.

11. A power inverter system comprising:
a plurality of switching units, wherein each one of the plurality of switching units is adapted to receive a respective input power (UDC) and wherein the plurality of switching units are interconnected to produce a combined output power waveform (UOUT) transmitted in a common AC power path; and
a voltage equalizer comprising an energy storage element adapted to: be connected to the common AC power path to receive the combined output waveform, be charged by the combined output power, and add voltage to the combined output power,
the voltage equalizer further comprising:
a measuring unit adapted to measure a voltage of the combined output power waveform,
a calculating unit adapted to determine a difference between the measured voltage and a voltage of a target power waveform, and
control circuitry adapted to add, to the combined output power waveform, a voltage corresponding to the determined difference.

12. The power inverter system according to claim 11, wherein the control circuitry is further adapted to charge the energy storage element in case the measured voltage exceeds the voltage of the target power waveform, and to input voltage to the combined output power waveform in case the measured voltage is below the voltage of the target power waveform.

13. The power inverter system according to claim 11, wherein the energy storage element is a capacitor.

14. The power inverter system according to claim 11, wherein the voltage equalizer is connected in series with the plurality of switching units.

15. The power inverter system according to claim 11, wherein the plurality of switching units are arranged in cascade configuration.

16. The power inverter system according to claim 11, wherein each one of the switching units are connected to a photovoltaic panel, respectively.

17. The power inverter system according to claim 11, further comprising a transformer connected between the voltage equalizer and the switching units so as to transform a voltage and a current output from the voltage equalizer to the combined output.

* * * * *